US006646607B2

(12) United States Patent
Usui et al.

(10) Patent No.: US 6,646,607 B2
(45) Date of Patent: Nov. 11, 2003

(54) ANTENNA SYSTEM, TRANSCEIVER, ELECTRICAL EQUIPMENT, AND COMPUTER TERMINAL

(75) Inventors: Hideyuki Usui, Kanagawa-ken (JP); Takeshi Asano, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/064,029

(22) Filed: Jun. 4, 2002

(65) Prior Publication Data

US 2003/0063032 A1 Apr. 3, 2003

(30) Foreign Application Priority Data

Jun. 8, 2001 (JP) ........................................ 2001-174763

(51) Int. Cl.[7] ............................. H01Q 1/38; H01Q 1/24

(52) U.S. Cl. ................................ 343/700 MS; 343/702; 343/770

(58) Field of Search .......................... 343/700 MS, 702, 343/767, 770, 846, 895

(56) References Cited

U.S. PATENT DOCUMENTS 4,827,271 A * 5/1989 Berneking et al. ... 343/700 MS
6,040,803 A * 3/2000 Spall ................... 343/700 MS

* cited by examiner

Primary Examiner—Hoang Nguyen
(74) Attorney, Agent, or Firm—L. Bruce Schelkopf

(57) ABSTRACT

A first antenna and a second antenna in first and second antenna-only areas of each face of an insulating substrate are arranged to decrease an antenna system having a plurality of antennas in size as the first antenna-only area and the second antenna-only area at least overlap with each other when viewed from a direction vertical to a face of the insulating substrate.

13 Claims, 8 Drawing Sheets

Figure 5
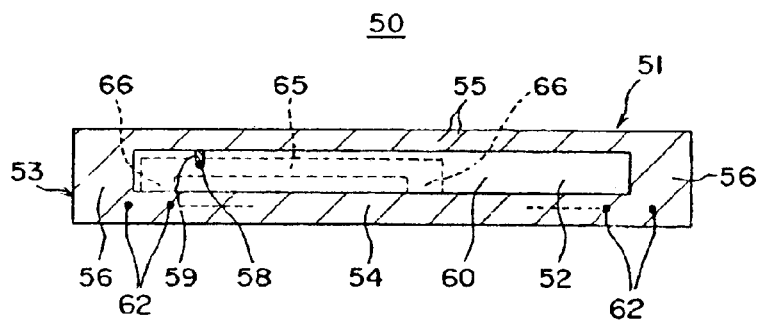
[Figure 6]
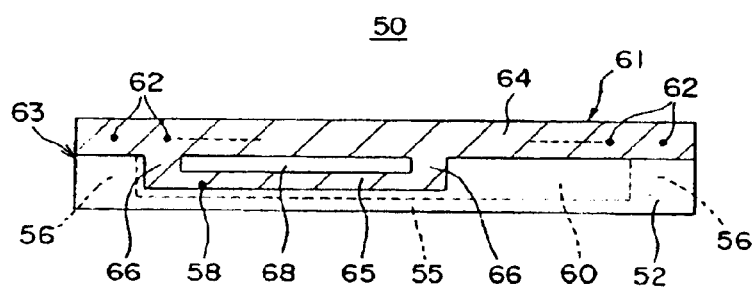

ANTENNA SYSTEM, TRANSCEIVER, ELECTRICAL EQUIPMENT, AND COMPUTER TERMINAL

BACKGROUND OF INVENTION

1. Field of the Invention

The present invention relates to an antenna system, a transceiver, electrical equipment, and a computer terminal, and more particularly to devices capable of corresponding to transmitting and/or receiving radio waves in a plurality of frequencies.

2. Description of the Related Art

Published Unexamined Japanese Patent Applications Nos. 10-276033 and 11-168323 disclose antenna systems which decrease in size by forming a conductive portion of an antenna at both faces of an insulating substrate as a conductive film. That is, in the case of the disk monopole antenna in Published Unexamined Japanese Patent Application No. 10-276033, circular conductive films of a radio-wave resonant portion and a ground portion are formed at both faces of an insulating substrate so as to shift from each other when viewed from a direction vertical to the insulating substrate. Moreover, dipole elements of the logarithmically periodic dipole antenna in Published Unexamined Japanese Patent Application No. 11-168323 are formed at both faces of an insulting substrate so as to extend in directions opposite to one another from two parallel lines.

In the case of the antennas in Published Unexamined Japanese Patent Applications Nos. 10-276033 and 11-168323, it is disclosed that elements of each of the antennas are distributed at both faces of an insulating substrate and that one antenna is comprised of the elements distributed at both faces. In the case of antenna systems in Published Unexamined Japanese Patent Applications Nos. 10-276033 and 11-168323, to form a plurality of antennas on a common insulating substrate, it is desirable to arrange the antennas on the insulating substrate so as each antenna does not overlap with each other antenna when viewed from a direction vertical to the insulating substrate. For example, to set two antennas to a common insulating substrate, the size of the insulating substrate is doubled as compared with the case of setting one antenna to the insulating substrate.

SUMMARY OF INVENTION

It is an object of the present invention to provide an antenna system, a transceiver, electrical equipment, and a computer terminal respectively decreased in size.

In one aspect of the present invention, an antenna system is comprised of:

- an insulating substrate having a first antenna-only area and a second antenna-only area, wherein the first area and the second area are configured to overlap with each other when viewed from a direction vertical to a face from both of the side faces,
- a first antenna having a conductive film in the first antenna-only area of the insulating substrate and which acts as an antenna for transmitting and/or receiving radio waves of a first frequency, and
- a second antenna having a conductive film in the second antenna-only area of the insulating substrate and which acts as an antenna for transmitting and/or receiving radio waves of a second frequency which is lower than the first frequency.

As used herein, the term "Antenna-only area" is defined to include a range of a convex polygon of a necessary minimum area including all elements of an antenna. Antenna elements include not only a ground portion and a conductive film such as x5, but also include a gap area formed between the ground portion and an x5.

First and second antennas are not restricted to transceiving antennas as each may be a transmission-only antenna or a reception-only antenna. Moreover, in another aspect of the present invention either the first or the second antenna may be used as a transmission-only antenna whereby the other antenna would act as a reception-only antenna. The Standards as used in the present invention also include those of a wireless LAN such as 802.11b and 802.11a, wherein 2.45 GHz and 5.2 GHz are radio frequencies used for 802.11b and 802.11a. In another aspect of the present invention, a first antenna and a second antenna may be used in conjunction with separate frequencies of a wireless LAN, that is, a frequency for 802.11b and a frequency for 802.11a, respectively. Moreover, because the frequency of 802.11b is almost equal to a that of a Bluetooth frequency, it is possible to use the frequency of a first antenna and that of a second antenna for Bluetooth and 802.11a.

Thus, it is possible to arrange a first antenna and a second antenna in first and second antenna-only areas of each face of an insulating substrate and decrease an antenna system having a plurality of antennas in size because the first antenna-only area and the second antenna-only area at least overlap with each other when viewed from a direction vertical to a face of the insulating substrate.

In the case of an antenna system of a predetermined mode, a first antenna-only area is included in a second antenna-only area when viewed from a direction vertical to a face of an insulating substrate.

In the case of the antenna system of the predetermined mode, first and second antennas are respectively provided with a radio-wave resonant portion and a ground portion extending in parallel with each other and the ground portions of the first and second antennas almost overlap with each other when viewed from a direction vertical to a face of an insulating substrate. The antenna system of the predetermined mode has a plurality of ground vias for connecting the ground portions of the first and second antennas distributed in the range of the ground portions of the antennas each other.

According to the antenna system of the predetermined mode, the first and second antennas are respectively provided with a radio-wave resonant portion and a ground portion extending in parallel with each other and the radio-wave resonant portions of the first and second antennas are arranged so as not to overlap with each other when viewed from a direction vertical to a face of an insulating substrate. The antenna system of the predetermined mode has a feed via whose one end is located outside of the radio-wave resonant portion of the antenna at the one-end side and whose other end is located inside of the radio-wave resonant portion of the antenna at the other-end side and a conductive portion for electrically connecting one end of the feed via to a predetermined position of the radio-wave resonant portion of the antenna at the one-end side.

According to the antenna system of the predetermined mode, the first and second antennas are slot antennas or inverted-F-type antennas. According to the antenna system of the predetermined mode, the radio-wave resonant portions of the first and second antennas are provided with radio-wave resonant portions and ground portions extending in parallel with each other, when viewed from a direction vertical to a face of an insulating substrate, the ground portions of the first and second antennas almost overlap with each other, and the radio-wave resonant portion of the first antenna is set between the radio-wave resonant portion and ground portion of the second antenna so as not to overlap with the radio-wave resonant portion of the second antenna.

A transceiver of the present invention has the following:
- an insulating substrate having first and second antenna-only areas at least overlapping with each other when viewed from a direction vertical to a face from both of the side faces;
- a first antenna whose element is formed by a conductive film in the first antenna-only area of the insulating substrate as an antenna for transmitting and/or receiving radio waves of a first frequency;
- a second antenna whose element is formed by a conductive film in the second antenna-only area of the insulating substrate as an antenna for transmitting and/or receiving radio waves of a second frequency lower than the first frequency;
- a ground via for connecting ground portions of the first and second antennas each other;
- a feed via for connecting feed points at the radio-wave resonant portions of the first and second antennas each other;
- a feed cable whose ground line and feed line are connected to the feed via and the ground portion of the first or second antenna, respectively; and
- a frame ground member connected to the ground portion of the first or second antenna.

The feed cable includes not only a coaxial cable but also a Lecher wire, a microstrip, and a waveguide. As used herein, the term "Frame ground" is a used to point portions of ground potentials of various electrical equipment (including a computer terminal).

A transceiver of a predetermined mode has first signal-processing means for a first antenna, second signal-processing means for a second antenna, and selection means for selecting either of the first and second signal-processing means and connecting the selected signal-processing means to a feed cable.

Electrical equipment of the present invention uses a transceiver. The transceiver used includes not only transceivers already described but also the following transceivers. That is, the transceiver has an insulating substrate having first and second antenna-only areas at least overlapping with each other when viewed from a direction vertical to a face at the both side faces respectively, a first antenna whose element is formed of a conductive film in the first antenna-only area of the insulating substrate as an antenna for transmitting and/or receiving radio waves of a first frequency, a second antenna whose element is formed of a conductive film in the second antenna-only area as an antenna for transmitting and/or receiving radio waves of a second frequency lower than the first frequency, a ground via for connecting ground portions of the first and second antennas each other, a feed via for connecting feed points of the radio-wave resonant portions of the first and second antennas each other, a feed cable whose ground line and feed line are connected to the feed via and the ground portion of the first or second antenna, first signal-processing means for the first antenna, second signal-processing means for the second antenna, and selection means for selecting either of the first and second signal-processing means and connecting the selected signal-processing means to the feed cable.

Electrical equipment includes AV (Audio and Visual) equipment and electrical home appliances such as a microwave oven and a full-automatic washing machine.

A computer terminal of the present invention has a body equipped with an operational section, a cover equipped with a display to cover the body at a closed position, and a hinge member for connecting the body with the cover so that the cover swings against the body between its closed position and open position. The cover includes an insulating substrate having first and second antenna-only areas at least overlapping with each other when viewed from a direction vertical to a face at the both side faces respectively, a first antenna whose element is formed by a conductive film in the first antenna-only area of the insulating substrate as an antenna for transmitting and/or receiving radio waves of a first frequency, a second antenna whose element is formed by a conductive film in the second antenna-only area of the insulating substrate as an antenna for transmitting and/or receiving radio waves of a second frequency lower than the first frequency, a ground via for connecting ground portions of the first and second antennas each other, a feed via for connecting feed points at the radio-wave resonant portions of the first and second antennas each other, and a feed cable whose ground line and feed line are connected to the feed via and the ground portion of the first or second antenna.

The computer terminal may include any of a notebook-type PC (Personal Computer), a PDA (Personal Digital Assistant: portable information terminal unit), and/or a game terminal. The operational section denotes a key arrangement section.

A computer terminal of a predetermined mode has first signal-processing means for a first antenna, second signal-processing means for a second antenna, and selection means for selecting either of the first and second signal-processing means and connecting the selected signal-processing means to a feed cable. It is preferable that these first and second signal-processing means and the selection means are included in the body.

According to the computer terminal of the predetermined mode, a hinge member has a conductive rotary shaft and conductive body-side hinge and cover-side hinge which are rotatable about the axis of the rotary shaft and which combine with the body and cover and rotate together, the cover-side hinge extends up to the vicinity of the front end of the cover far from the rotary shaft, and an antenna system includes an insulating substrate, and first and second antennas and is set to the cover-side hinge so that it face-contacts the vicinity of the front end of the cover-side hinge at the ground portions of the first and second antennas but it does not contact the cover-side hinge at radio-wave resonant portions of the first and second antennas. In the case of the computer terminal of the predetermined mode, the rotary shaft of the hinge member and the body-side hinge and cover-side hinge respectively serve as a ground frame.

BRIEF DESCRIPTION OF DRAWINGS

Other aspects, features, and advantages of the present invention will become more fully apparent from the following detailed description, the appended claims, and the accompanying drawings in which:

FIG. 5 is a front view of another inverted-F-type antenna system;

FIG. 6 is a back view of the inverted-F-type antenna system in FIG. 5;

DETAILED DESCRIPTION

Figure 1:
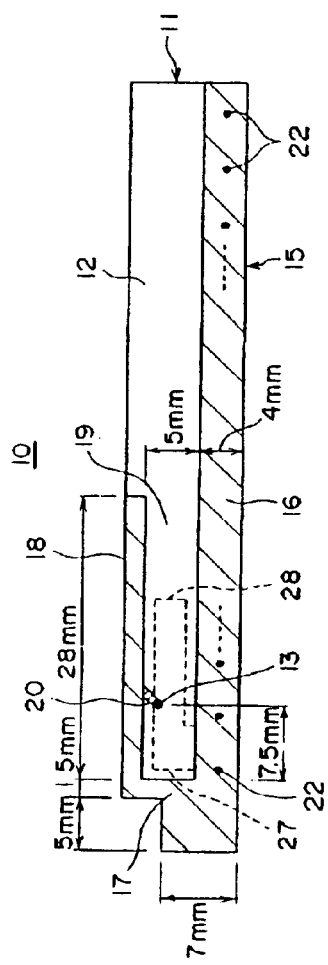
FIG. 1 is a front view of an inverted-F-type antenna system.

The use of figure reference labels in the claims is intended to identify one or more possible embodiments of the claimed subject matter in order to facilitate the interpretation of the claims. Such labeling is not to be construed as necessarily limiting the scope of those claims to the embodiments shown in the corresponding figures. The preferred embodiments of the present invention and its advantages are best understood by referring to the drawings, like numerals being used for like and corresponding parts of the various drawings.

Figure 2:
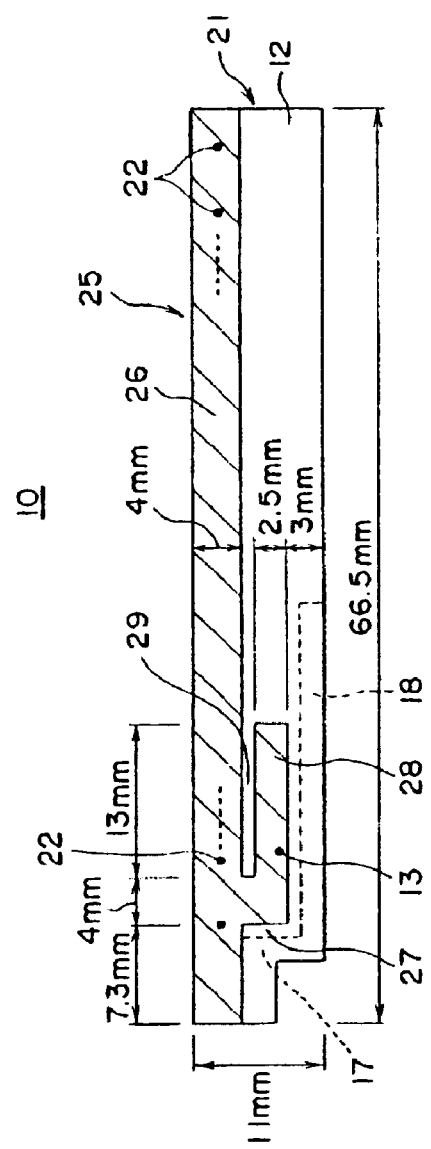
FIG. 2 is a back view of the inverted-F-type antenna system in FIG. 1.

FIGS. 1 and 2 are a front view and a back view of an inverted-F-type antenna system 10. The inverted-F-type antenna system 10 is used to transceive radio waves of 2.45 GHz and 5.2 GHz used for 802.11b and 802.11a which are standards of a wireless LAN. As described for FIG. 9 later, the front side and the back side of the inverted-F-type antenna system 10 of a notebook-type PC 80 (FIG. 8) correspond to the outside and the inside of the notebook-type PC 80. The shape and size of the inverted-F-type antenna system 10 are the same as the shape and size of an insulating substrate 12. For convenience, the major-and minor-side extending directions of the inverted-F-type antenna system 10 are referred to as "longitudinal direction" and "crosswise direction" of the system 10. The inverted-F-type antenna system 10 has a first face 11 (FIG. 1) and a second face 21 (FIG. 2) correspondingly to two faces of the insulating substrate 12 of the inverted-F-type antenna system 10. First and second inverted-F-type antennas 15 and 25 have elements at the first and second faces 11 and 21 one each as conductive films on the insulating substrate 12. Patterns of these conductive films are formed by forming a conductive layer at the both faces of the insulating substrate 12 through vapor deposition and then performing publicly-known etching by a semiconductor fabrication art. FIGS. 1 and 2 show dimensions of various portions of the inverted-F-type antenna system 10 in millimeters. The insulating substrate 12 is almost rectangular and has a thickness of, for example, 0.4 mm.

At the first face 11, the first inverted-F-type antenna 15 has a ground portion 16 and a radio-wave resonant portion 18 along the both major sides of the insulating substrate 12 and a connective conductive film 17 for connecting the ground portion 16 and radio-wave resonant portion 18 each other extending along a minor side of the insulating substrate 12 at one end of the inverted-F-type antenna 10 in its longitudinal direction. The ground portion 16 extends over the entire major side of the insulating substrate 12 and the extending dimension of the radio-wave resonant portion 18 from the connective conductive film 17 is set to a length of ¼ the wavelength 1 of a radio wave of 2.45 GHz. An insulating face 19 is exposed between the ground portion 16 and radio-wave resonant portion 18 as a portion of the insulating substrate 12 of the first face 11. A feed via 13 passes through the insulating substrate 12 at a position slightly separate from the side margin of the radio-wave resonant portion 18 toward the ground portion 16 in the crosswise direction of the inverted-F-type antenna system 10 and a feed-point-connecting conductive film 20 electrically connects the feed via 13 to a predetermined position of the radio-wave resonant portion 18 in the longitudinal direction of the inverted-F-type antenna 10. The connection point of the feed-point-connecting conductive film 20 to the radio-wave resonant portion 18 serves as the feed point of the inverted-F-type antenna 15. A plurality of ground vias 22 are arranged at equal intervals along the center line of the width of the ground portion 16, pass through the insulating substrate 12, and electrically connect the ground portions 16 and 26 (FIG. 2) each other at the both ends.

At the second face 21, the second inverted-F-type antenna 25 has the ground portion 26 extending along one major side of the insulating substrate 12, a radio-wave resonant portion 28 extending in the longitudinal direction of the inverted-F-type antenna system 10 in parallel with the ground portion 26 at the middle position of the width of the insulating substrate 12, and a connective conductive film 27 extending in the crosswise direction of the inverted-F-type antenna system 10 to connect the ground portion 26 and the radio-wave resonant portion 28 each other. The ground portion 26 extends over the entire major side of the insulating substrate 12 and the radio-wave resonant portion 28 is set to a length of about ¼ the wavelength 1 of a radio wave of 5.2 GHz. An insulating face 29 is exposed between the ground portion 26 and the radio-wave resonant portion 28 as a portion of the insulating substrate 12 at the second face 21. The feed via 13 is present at the proximal end of the radio-wave resonant portion 28 (in the case of the radio-wave resonant portion 28, the end close to the connective conductive film 27 is referred to as "proximal end" and the end far from the connective conductive film 27 is referred to as "front end") and nearby the radio-wave resonant portion 18 at the first face 11 in a back view.

In a front view of the inverted-F-type antenna system 10, the ground portions 16 and 26 are completely superimposed with each other and the connective conductive films 17 and 27 are present at the same minor side of the insulating substrate 12. However, the connective conductive film 17 is present in an area including a minor side of the insulating substrate 12 while the connective conductive film 27 is present in an area shifted inward from the connective conductive film 17 in the longitudinal direction of the inverted-F-type antenna system 10. Moreover, in a front view of the inverted-F-type antenna system 10, the connective conductive film 27 and radio-wave resonant portion 28 at the second face 21 are arranged in the area of the insulating face 19 at the first face 11. It is avoided that the connective conductive films 17 and 27 overlap with each other and the radio-wave resonant portions 18 and 28 overlap with each other in a front view of the inverted-F-type antenna system 10. The feed via 13 is present at a predetermined position in the extending direction of the radio-wave resonant portion 28 in the area of the radio-wave resonant portion 28 and is electrically connected with the radio-wave resonant portion 28.

Figure 3:
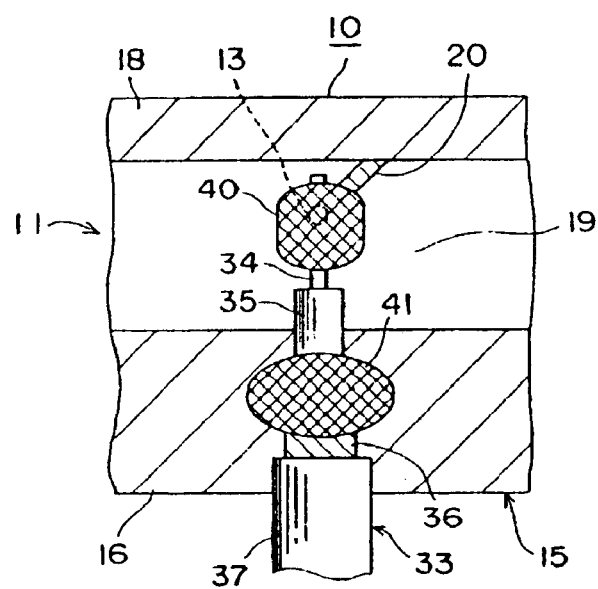
FIG. 3 is an illustration showing a state of connecting a coaxial cable 33 to the inverted-F-type antenna system in FIG. 1.

FIG. 3 shows a state in which a coaxial cable 33 is connected to the inverted-F-type antenna 10. The coaxial cable 33 has a conductor 34, an inside sheathing 35, a shielding wire 36, and an outside sheathing 37 which are coaxially arranged in order from the inside. The conductor 34 transfers transmission and reception signals and the shielding wire 36 is kept at a ground voltage. At an end of the coaxial cable 33 at the inverted-F-type antenna system 10, the inside sheathing 35 and outside sheathing 37 are stripped by a proper length so that the conductor 34 and shielding wire 36 are exposed. An end of the coaxial cable 33 at the inverted-F-type antenna system 10 is set to the first face 11 of the inverted-F-type antenna system 10. The conductor 34 is fixed to the feed via 13 through soldering 40. The shielding wire 36 is fixed to the ground portion 16 through soldering 41. The conductor 34 transfers transmission and reception signals. Thereby, the connective position of the feed-point-connecting conductive film 20 to the radio-wave resonant portion 18 serves as a feed point at the radio-wave resonant portion 18 and moreover, in the case of the second inverted-F-type antenna 25, the position of the feed via 13 serves as a feed point at the radio-wave resonant portion 28. The ground portion 16 of the first inverted-F-type antenna 15 and the ground portion 26 of the second inverted-F-type antenna 25 are connected each other through a plurality of ground vias 22 (FIGS. 1 and 2) thereby, kept at the same ground voltage. As shall be described in more detail, when the inverted-F-type antenna system 10 is set to the notebook-type PC 80, the ground portions 16 and 26 are connected to ground through not only the shielding wire 36 of the coaxial cable 33 but also a hinge arm 91 made of stainless steel.

Actions of the inverted-F-type antenna system 10 are described below. When using the radio wave of 2.45 GHz corresponding to 802.11b of a wireless LAN, the radio wave is transceived by the first inverted-F-type antenna 15 at the first face 11 of the inverted-F-type antenna system 10. Moreover, when using the radio wave of 5.2 GHz corresponding to 802.11a of a wireless LAN, the radio wave is transceived by the second inverted-F-type antenna 25 at the second face 21 of the inverted-F-type antenna system 10.

When actually applying the inverted-F-type antenna system 10 to an electrical home appliance or a notebook-type PC 80, feed positions of the first and second inverted-F-type antennas 15 and 25 of the inverted-F-type antenna system 10 are changed even if the transmission and reception frequencies are the same because the environment in which the inverted-F-type antenna system 10 is set depends on the electrical home appliance or the type of the notebook-type PC 80. At the design stage of the inverted-F-type antenna system 10, a feed position where transmission/reception of radio waves by the second inverted-F-type antenna 25 is optimized, that is, the impedance viewing the radio-wave resonant portion 18 from the feed position becomes approx. 50 W by considering impedance matching is first examined and the feed via 13 is set to a longitudinal position of the inverted-F-type antenna system 10 which is determined as an optimum feed position. Then, a feed position where transmission/reception of radio waves by the first inverted-F-type antenna 15 is optimized is examined and the feed-point-connecting conductive film 20 sets the radio-wave resonant portion 18 so as to be connected at a longitudinal position of the inverted-F-type antenna system 10 determined as an optimum feed position. Because the radio-wave resonant portion 18 and 28 do not overlap with each other in a front view of the inverted-F-type antenna system 10, the mutual capacity between the first and second inverted-F-type antennas 15 and 25 is reduced and the mutual interference between the first and second inverted-F-type antennas 15 and 25 is suppressed.

Because the ground portions 16 and 26 are overlapped with each other in a front view of the inverted-F-type antenna system 10, it is possible to easily connect the both portions each other by the ground via 22. As a result of connecting the ground portions 16 and 26 each other by the ground via 22, it is possible to omit either of the ground portions 16 and 26 by connecting a ground wire to the other of the ground portions 16 and 26. Because it is possible to use the coaxial cable 33 for the first and second inverted-F-type antennas 15 and 25 of the inverted-F-type antenna system 10 in common without individually preparing the cable 33 for the antennas 15 and 25, the wiring of the inverted-F-type antenna system 10 when mounted can be simplified. Moreover, when connecting a ground connector to be described later like the hinge arm 91 (FIG. 9) to the inverted-F-type antenna system 10 separately from the shielding wire 36 of the coaxial cable 33, it is usually enough to connect the connector only to either of the ground portions 16 and 26 at the opposite side to the setting side of the coaxial cable 33.

Figure 4:
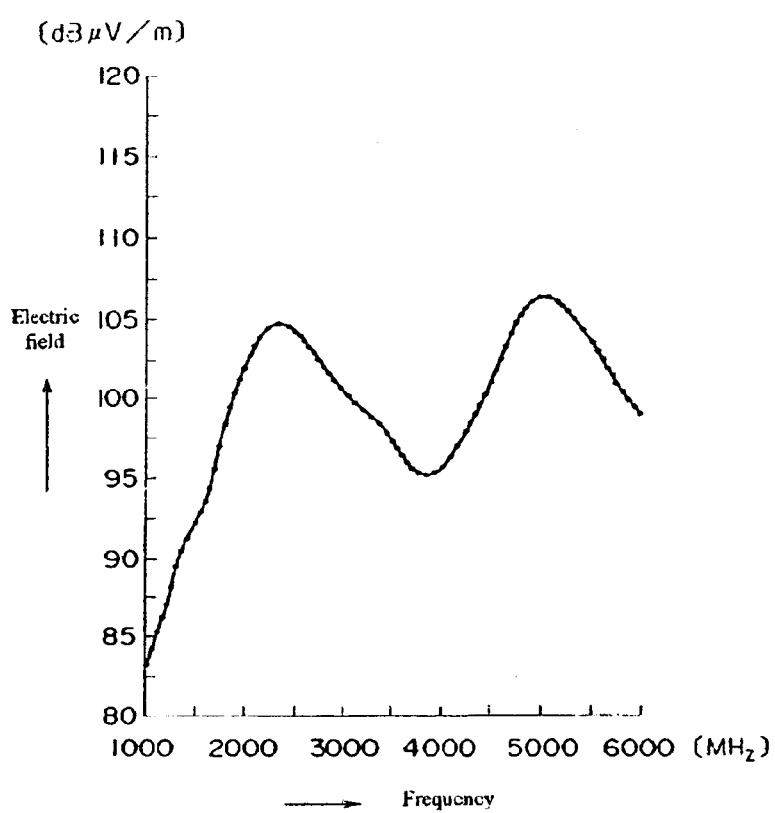
FIG. 4 is a simulation graph showing a performance of the inverted-F-type antenna system in FIG. 1.

FIG. 4 is a simulation graph showing a result of examining the performance of the inverted-F-type antenna system 10. While supplying a RF signal having an effective power of 10 mW to the feed via 13 of the inverted-F-type antenna system 10, the frequency of the RF signal is scanned at a predetermined interval. FIG. 4 shows a characteristic curve obtained by simulating a reception electric field at a position approx. 10 m separate from the inverted-F-type antenna system 10 in the pointing direction of the inverted-F-type antenna system 10. From the graph in FIG. 4, it is found that a strong-enough electric field appears when a frequency is equal to 2.45 GHz or 5.2 GHz and the inverted-F-type antenna system 10 has a sufficient performance.

FIGS. 5 and 6 are a front view and a back view of another slot antenna system 50. The slot antenna system 50 is also used to transceive radio waves of 2.45 GHz and 5.2 GHz used for 802.11b and 802.11a which are standards of a wireless LAN similarly to the case of the inverted-F-type antenna system 10. The slot antenna system 50 is provided with first and second faces 51 and 61 and first and second slot antennas 53 and 63 have their elements as conductive films on an insulating substrate 52 at the first and second faces 51 and 61. Patterns of these conductive films are formed by forming a conductive layer over the entire both faces of the insulating substrate 52 through vapor deposition and performing predetermined etching similarly to the case of the inverted-F-type antenna system 10. Longitudinal lengths of radio-wave resonant portions 55 and 65 are set to ½ when assuming wavelengths of radio waves of 2.45 GHz and 5.2 GHz as 1

The first slot antenna 53 has a ground portion 54 and a radio-wave resonant portion 55 extending along major sides of the slot antenna 50 in parallel with each other and connective conductive films 56 extending along minor sides of the slot antenna 50 to connect the ground portion 54 and radio-wave resonant portion 55 each other. The ground portion 54, radio-wave resonant portion 55, and two connective conductive films 56 constitute a rectangular frame and an insulating face 60 is present in the frame as an exposed face of the insulating substrate 52. A feed via 58 passes through the insulating substrate 52 at a position slightly separate from the radio-wave resonant portion 55 toward the ground portion 54 in the crosswise direction of the slot antenna system 50 and a position a predetermined distance separate from one of the connective conductive films 56 in the longitudinal direction of the slot antenna 50. A feed-point-connecting conductor 59 connects the feed via 58 with a predetermined position of the radio-wave resonant portion 55 in the longitudinal direction of the inverted-F-type antenna system 10. As the connective position of the feed-point-connecting conductor 59 to the radio-wave resonant portion 55 in the longitudinal direction of the slot antenna system 50, a connective position where the highest transceiving performance is obtained for the frequency of a transmission/reception RF signal of the first slot antenna 53 in accordance with electrical equipment on which the slot antenna system 50 is mounted, that is, a position where the impedance when viewing the radio-wave resonant portion 55 from a feed position becomes 50 W is examined at the design stage of the slot antenna system 50 and the system 50 is set to the determined position similarly to the case of the feed-point-connecting conductive film 20 of the above-described inverted-F-type antenna system 10. A plurality of ground vias 62 are arranged at equal intervals along the center line of the width of the ground portion 54, pass through the insulating substrate 52, and connect the ground portion 54 and the ground portion 64 at the second face 61 (FIG. 6) each other.

The second slot antenna 63 has a ground portion 64 extending along one major side of the slot antenna system 50, a radio-wave resonant portion 65 extending in parallel with the ground portion 64 at the middle position of the width of the insulating substrate 52, and a connective conductive film 66 extending in the longitudinal direction of the slot antenna system 50 to electrically connect the longitudinal both ends of the radio-wave resonant portion 65 to the ground portion 64. The ground portion 64, radio-wave resonant portion 65, and two connective conductive films 66 constitute a rectangular frame and an insulating face 68 is left as the exposed face of the insulating substrate 52. In a front view of the slot antenna system 50, the radio-wave resonant portion 65 and two connective conductive films 66 are present inside of the insulating face 60 while they are shifted to one minor side of the slot antenna system 50 so that they do not overlap with the radio-wave resonant portions 55 and 65. The feed via 58 is present at a position in the radio-wave resonant portion 65 separate by a predetermined distance from one connective conductive film 66 toward the other connective conductive portion 66 in the longitudinal direction of the slot antenna system 50 at the second face 61. A position where the highest transceiving performance is obtained for the frequency of a transmission/reception RF signal of the second slot antenna 63 in accordance with electrical equipment on which the slot antenna system 50 is mounted, that is, a position where the impedance when viewing the radio-wave resonant portion 65 becomes 50 W is examined at the design stage of the slot antenna system 50 and the determined position is set as the position of the feed via 58 at the radio-wave resonant portion 65 in the longitudinal direction of the slot antenna system 50 similarly to the case of the feed via 13 of the above inverted-F-type antenna system 10.

Figure 7:
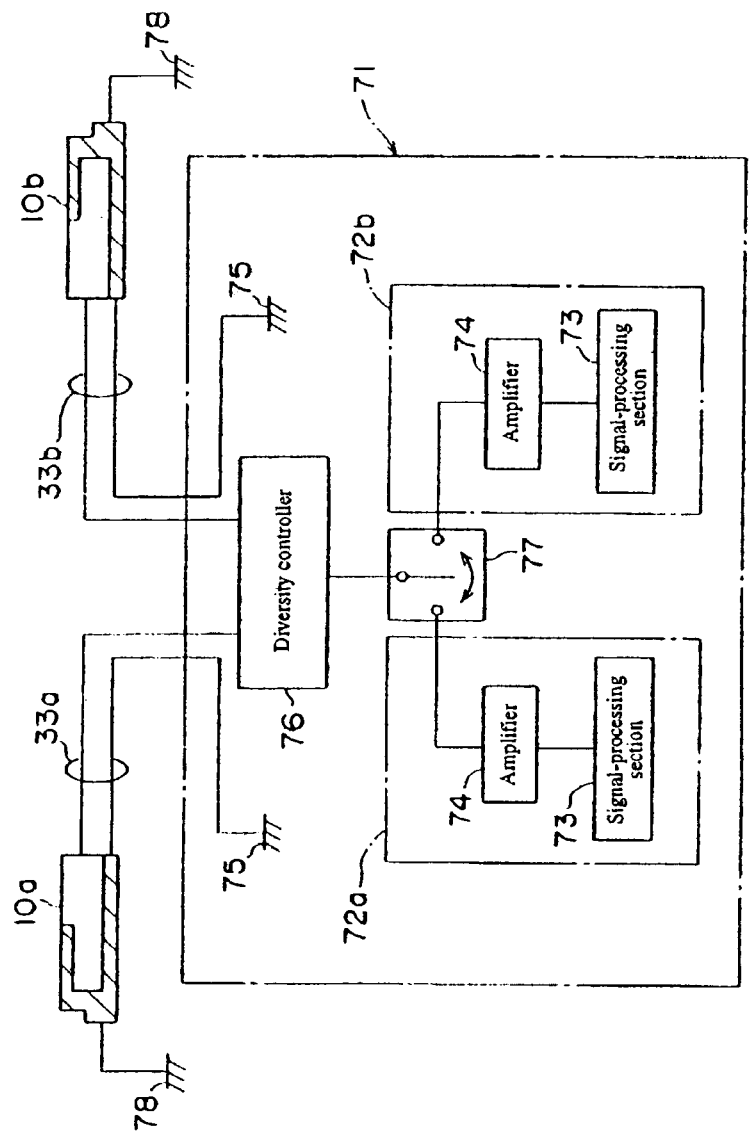
FIG. 7 is a block diagram of a PC card for changing effective antennas.

FIG. 7 is a block diagram of a PC card 71 for changing effective antennas. A mini-PCI or COMPACT FLash (registered trademark) (transliterated) can be substituted for the PC card 71. Electrical equipment provided with the PC card 71 is equipped with inverted-F-type antenna systems 10a and 10b having the same structure as the inverted-F-type antenna system 10 shown in FIGS. 1 and 2 and the inverted-F-type antenna systems 10a and 10b are arranged at different places of the electrical equipment provided with the systems 10a and 10b. The inverted-F-type antenna systems 10a and 10b are connected to the PC card 71 through coaxial cables 33a and 33b (these coaxial cables 33a and 33b have the same structure as the coaxial cable 33 in FIG. 3). In the case of the coaxial cables 33a and 33b, their conductors 34 are connected to a diversity controller 76 at the PC card 71 and their shielding wires 36 are connected to a ground portion 75 in the card. Ground portions 16 and 26 of the inverted-F-type antenna systems 10a and 10b are typically connected to the ground portion 75 in the PC card 71 or the like through the shielding wires 36 of the coaxial cables 33a and 33b and moreover, connected to the ground portion of a body 81 (FIG. 8) through the hinge arm 91 in FIG. 9 to be described later to increase a ground capacity. The diversity controller 76 regularly detects an inverted-F-type antenna system having a higher transceiving sensitivity out of the two inverted-F-type antenna systems 10a and 10b, selects the inverted-F-type antenna system having a higher transceiving sensitivity as an inverted-F-type antenna system to be used, and transceives an RF signal with the selected inverted-F-type antenna system. First and second RF-signal processors 72a and 72b are provided for the PC card 71 as processors corresponding to frequencies of RF signals of the first and second inverted-F-type antennas 15 and 25 and a switching unit 77 connects the diversity controller 76 to the first or second RF-signal processor 72a or 72b corresponding to the frequency of a RF signal used this time. The first and second RF-signal processors 72a and 72b respectively have a signal-processing section 73 and an amplifier 74. The signal-processing section 73 convert RF signals received through radio waves by the inverted-F-type antenna systems 10a and 10b into predetermined signals and generate RF signals to be transmitted through radio waves by the inverted-F-type antenna systems 10a and 10b. The amplifier 74 amplifies a RF signal output from the signal-processing section 73 and sends the signal to the switching unit 77 and moreover amplifies a RF signal sent from the switching unit 77 and sends the signal to the signal-processing section 73. Thus, in the case of the PC card 71, an inverted-F-type antenna system having a higher transceiving sensitivity is selected out of the two inverted-F-type antenna systems 10a and 10b and used and moreover, an inverted-F-type antenna corresponding to a frequency used this time is selected out of the first and second inverted-F-type antennas 15 and 25 and used.

Figure 8:
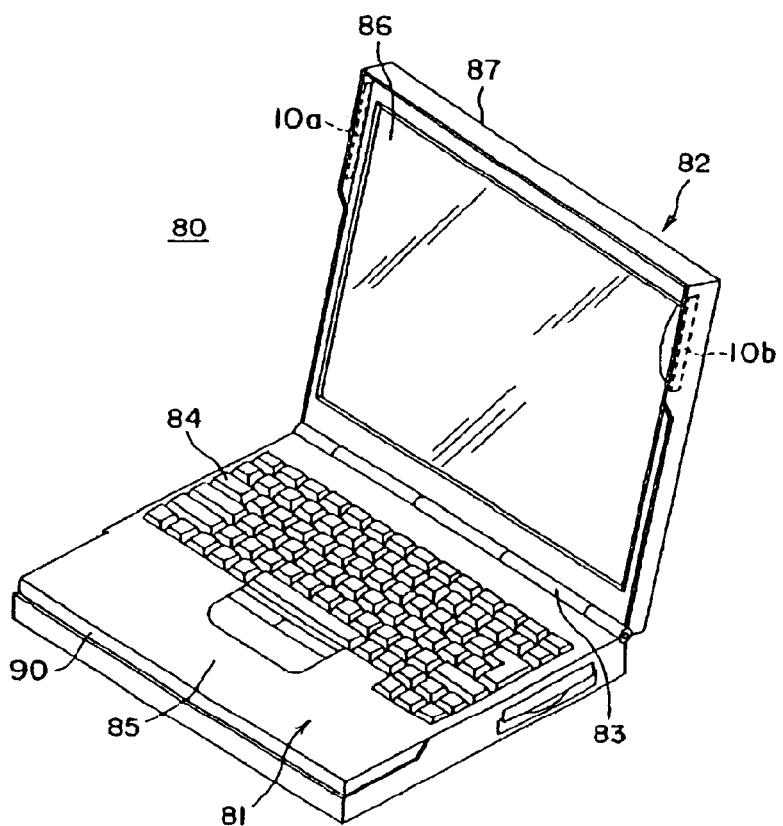
FIG. 8 is a perspective view showing a notebook-type PC equipped with an inverted-F-type antenna system at the open position of a cover.

FIG. 8 is a perspective view showing a notebook-type PC (Personal Computer) 80 equipped with the inverted-F-type antenna systems 10a and 10b at the opening position of a cover 82. The notebook-type PC 80 has a body 81 and the cover 82 for swingably combining the proximal side with the innermost side of the body 81 via the hinge member 83. The cover 82 is present at the closed position when the notebook-type PC 80 is not operated and the open position when the PC 80 is operated and covers the upper face of the body 81 at the closed position but it stands at an angle close to 90° from the body 81 at the open position. A keyboard 84 is set at the innermost on the upper face of the body 81 and a arm rest 85 is set at the proximal end of the body 81. The body-81 side of the cover 82 is provided with a liquid-crystal display 86, a frame 87 set along the circumference of the liquid-crystal display 86, and a cover housing 88 into which the liquid-crystal display 86 to which the frame 87 is already set is inserted to cover rear faces and side faces of the liquid-crystal display 86 and frame 87. An overhang plate 89 protruding forward (toward an operator of the note-book-type PC 80) by a predetermined distance from the frame 87 is formed on the cover housing 88 over the range between the front side of the cover 82 (upper side of the cover 82 at the open position) and front ends of the right and left sides of the cover 82. A concave portion 90 is formed at the upper end of the side wall of the body 81 over the range between the this-side side wall of the body 81 and the this-side ends of the right and left side walls of the body 81 and the overhang plate 89 is inserted into the concave portion 90 when the cover housing 88 is present at the closed position. The inverted-F-type antenna systems 10a and 10b are built in the right and left ranges of the overhang plate 89. At the open position of the cover 82, the inverted-F-type antenna systems 10a and 10b are held at high-enough positions and thereby, preferable transceiving sensitivity is secured.

Figure 9:
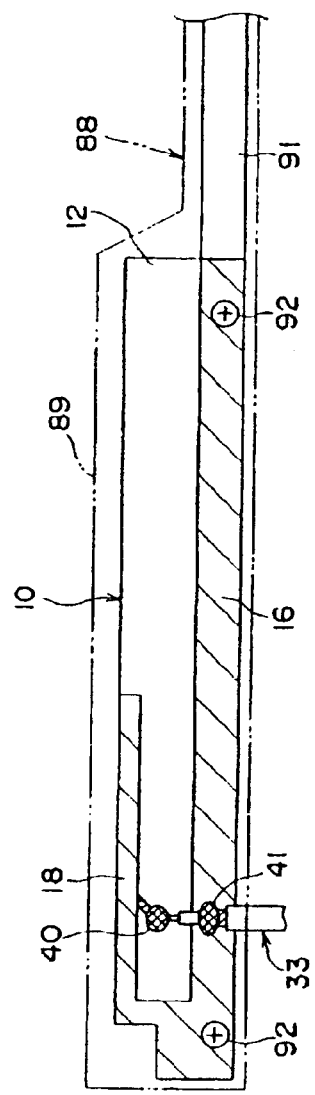
FIG. 9 is an illustration showing a state of setting the inverted-F-type antenna system in FIG. 8.

FIG. 9 shows a setting state of the inverted-F-type antenna system 10a in FIG. 8 is set. Though a setting state of the inverted-F-type antenna system 10b is not illustrated, the inverted-F-type antenna system 10b is also set similarly to the case of the inverted-F-type antenna system 10a. The hinge arm 91 made of stainless steel having predetermined strength and conductivity extends on the inner face of the left side of the cover housing 88 along the left side of the housing 88 and combines with the body-81-side end of the hinge member 83 so as to swing together with the end. Though the detailed structure of the hinge member 83 is not illustrated, it has a body-81-side and cover-82-side ends which are swingable each other and the both ends of the member 83 are conductive and electrically connected each other through a conductive bidirectional-rotation shaft. As a result, the hinge arm 91 is connected to the ground in the body 81 through the body-81-side end of the hinge member 83. The inverted-F-type antenna system 10 is covered by the overhang plate 89 of the cover housing 88 from the outside at the first face 11. The radio-wave resonant portions 18 and 28 (FIG. 2) are located in the forward-protruding portion of the overhang plate 89 and properly separated from the ground in the cover 82 for the hinge arm 91 and the like. Conductive portions of the hinge arm 91 and hinge member 83 serve as frame ground members of a notebook-type PC. At the position corresponding to the both ends in the longitudinal direction of the ground portion 16 each screw 92 passes through the through-hole (not illustrated) of the inverted-F-type antenna system 10a and the through-hole (not illustrated) of the hinge arm 91 in order and then they are screwed to threaded holes (not illustrated) of the frame 87.

What is claimed is:

1. An antenna system, comprising:
   an insulating substrate having a first antenna-only area and a second antenna-only area that overlap with each other when viewed from a direction vertical to a face at both side faces respectively;
   a first antenna whose element is formed by a conductive film in the first antenna-only area of said insulating substrate as an antenna for transmitting and/or receiving radio waves of a first frequency; and a second antenna whose element is formed by a conductive film in the second antenna-only area of said insulating substrate as an antenna for transmitting and/or receiving radio waves of a second frequency lower than said first frequency, wherein said first and second antennas are respectively provided with a radio-wave portion and a ground portion extending in parallel with each other, and the ground portions of said first and second antennas almost overlap with each other when viewed from a direction vertical to a face of said insulating substrate.

2. The antenna system according to claim 1, wherein said first antenna-only area is included in said second antenna-only area when viewed from a direction vertical to a face of said insulating substrate.

3. The antenna system according to claim 1, wherein a plurality of ground vias are included which are distributed within the ground portions of said first and second antennas to electrically connect the both ground portions each other.

4. The antenna system according to claim 1, wherein said first and second antennas respectively have a radio-wave resonant portion and a ground portion extending in parallel with each other, and the radio-wave resonant portions of said first and second antennas are arranged so as not to overlap each other when viewed from a direction vertical to a face of said insulating substrate.

5. The antenna system according to claim 4, further comprising a feed via having a first end located at the outside of the radio-wave resonant portion of an antenna, and a second end located inside of the radio-wave resonant portion of an antenna, and a conductive port for electrically connecting one end of said feed via to a predetermined position of the radio-wave resonant portion of the antenna.

6. The antenna system according to claim 1, wherein said first and second antennas are slot antennas or inverted-F-type antennas.

7. The antenna system according to claim 6, wherein the radio-wave resonant portions of said first and second antennas respectively have a radio-wave resonant portion and a ground portion extending in parallel with each other, and the ground portions of said first an second antennas overlap with each other when viewed from a direction vertical to a face of said insulating substrate but the radio-wave resonant portions of said first antenna is set between the radio-wave resonant portion and the ground portion of said second antenna so as not to overlap with the radio-wave resonant portion of said second antenna.

8. A transceiver, comprising: an insulating substrate having first and second antenna-only overlapping with each other when viewed from a direction vertical to a face at the both side faces respectively; a first antenna whose element is formed by a conductive film in the first antenna-only area of said insulating substrate as an antenna for transmitting and/or receiving radio waves of a first frequency; a second antenna whose element is formed by a conductive film in the second antenna-only area of said insulating substrate as a antenna for transmitting and/or receiving radio waves of a second frequency lower than said first frequency; a ground via for connecting ground portions of said first and second antennas each other; a feed via for connecting feed points at the radio-wave resonant portions of said first and second antennas each other; a feed cable whose ground line and feed line are connected to said feed via and the ground portion of said first or second antenna, respectively; and a frame ground member connected to the ground portion of said first or second antenna.

9. The transceiver according to claim 8, comprising: a first signal-processing unit for said first antenna; a second signal-processing unit for said second antenna; and a selection unit for selecting either of said first and second signal-processing unit and connecting the selected signal-processing unit to said feed cable.

10. Electrical equipment, comprising a transceiver, wherein said transceiver has: an insulating substrate having first and second antenna-only areas at least overlapping with each other when viewed from a direction vertical to a face at the both side faces; a first antenna whose element is formed by a conductive film in the first antenna-only area of said insulting substrate as an antenna for transmitting and/or receiving radio waves of a first frequency; a second antenna whose element is formed by a conductive film in the second antenna-only area of said insulating substrate as an antenna for transmitting and/or receiving radio waves of a second frequency lower than said first frequency; a ground via for connecting ground portions of said first and second antennas each other; a feed via for connecting feed points at the radio-wave resonant portions of said first and second antennas each other; a feed cable whose ground line and feed line are connected to said feed via and the ground portion of said first or second antenna, respectively; a first signal-processing unit for said first antenna; a second signal-processing unit for said second antenna; and a selection unit for selecting either of said first and second signal-processing unit and connecting the selected signal-processing unit to said feed cable.

11. A computer terminal, comprising: a body having an operational portion; a cover for covering said body at a closed position where a display is set; and a hinge member for connecting said body and said cover each other so that said cover swings between its closed position and open position against said body, wherein said cover includes: an insulating substrate having first and second antenna-only areas at least overlapping with each other when viewed from a direction vertical to a face at the both side faces; a first antenna whose element is formed by a conductive film in the first antenna-only area of said insulting substrate as an antenna for transmitting and/or receiving radio waves of a first frequency; a second antenna whose element is formed by a conductive film in the second antenna-only area of said insulating substrate as an antenna for transmitting and/or receiving radio waves of a second frequency lower than said first frequency; a ground via for connecting ground portions of said first and second antennas each other; a feed via for connecting feed points at the radio-wave resonant portions of said first and second antennas each other; and a feed cable whose ground line and feed line are connected to said feed via and the ground portion of said first or second antenna, respectively.

12. The computer terminal according to claim 11, wherein a first signal-processing unit for said first antenna, a second signal-processing unit for said second antenna, and a selection unit for selecting either of said first and second signal-processing unit and connecting the selected signal-processing unit to said feed cable are included.

13. The computer terminal according to claim 11, wherein said hinge member has a conductive rotary shaft, and a conductive body-side hinge and a conductive cover-side hinge which are rotatable about the axis of the rotary shaft and combined with said body and said cover to rotate together, said cover-side hinge extends up to the vicinity of the front end of said cover far from the rotary shaft, and an antenna system includes said insulating substrate, first and second antennas and is set to said cover-side hinge so as to face-contact the vicinity of the front end of said cover-side hinge at the ground portion of said first or second antenna but not to contact said cover-side hinge at the radio-wave resonant portions of said first and second antennas.

* * * * *